（12） United States Patent
Kraemer

(10) Patent No.: US 7,914,747 B1
(45) Date of Patent: Mar. 29, 2011

(54) SYSTEM AND METHOD FOR CONTROLLING AND REDUCING $NO_x$ EMISSIONS

(75) Inventor: Gilbert Otto Kraemer, Greer, SC (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 12/766,593

(22) Filed: Apr. 23, 2010

(51) Int. Cl.
*B01D 50/00* (2006.01)
*B01D 53/56* (2006.01)

(52) U.S. Cl. ............ 422/170; 423/210; 423/239.1

(58) Field of Classification Search ............ 422/168, 422/172, 177; 423/210, 239.1
See application file for complete search history.

(56) References Cited

U.S. PATENT DOCUMENTS

| | | | | |
|---|---|---|---|---|
| 3,959,440 A | * | 5/1976 | Mizuno et al. ............ | 423/239.1 |
| 5,237,939 A | * | 8/1993 | Spokoyny et al. ........... | 110/345 |
| 5,308,810 A | * | 5/1994 | Voss et al. ............ | 502/28 |
| 5,775,266 A | * | 7/1998 | Ziegler ............ | 122/7 R |
| 6,696,031 B1 | * | 2/2004 | Twigg et al. ............ | 423/212 |
| 7,118,721 B2 | * | 10/2006 | Rini et al. ............ | 423/239.1 |
| 2002/0182122 A1 | * | 12/2002 | Wietzke et al. ............ | 422/139 |
| 2008/0233026 A1 | * | 9/2008 | Laslo ............ | 423/239.1 |
| 2010/0221164 A1 | * | 9/2010 | Lee et al. ............ | 423/239.2 |

* cited by examiner

*Primary Examiner* — Tom Duong
(74) *Attorney, Agent, or Firm* — Sutherland Asbill & Brennan LLP

(57) ABSTRACT

A system is provided for reducing $NO_x$ emission. The system includes a gas production source configured to produce a gas stream comprising $NO_x$, and an oxidation catalyst positioned downstream of the gas production source. The oxidation catalyst is configured to oxidize NO gas molecules in the gas stream to yield higher order $N_xO_y$ molecules. A removal system is positioned downstream of the oxidation catalyst and is configured to remove higher order $N_xO_y$ molecules from the gas stream by solvent absorption or reaction. The system further includes a secondary $NO_x$ trimming system positioned downstream of the oxidation catalyst, wherein the secondary $NO_x$ trimming system is configured to inject a reactant into the gas stream, the reactant configured to react with $NO_x$ molecules present in the gas stream.

20 Claims, 4 Drawing Sheets

SYSTEM AND METHOD FOR CONTROLLING AND REDUCING $NO_x$ EMISSIONS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is generally in the field of $NO_x$ emission abatement. More particularly, the present invention is directed to systems and methods for reducing NO emissions from $NO_x$ producing sources.

$NO_x$ emissions are a concern for many industries, particularly in power-generating industries. $NO_x$ production is common in high-temperature combustion applications and/or with the combustion of nitrogen-bearing fuels. At high combustion temperatures, diatomic nitrogen in the combustion air may be oxidized to produce $NO_x$. Nitrogen in the fuel may also be released as free radicals during combustion to form $NO_x$. $NO_x$ emissions are generally known to cause acid rain as well as deleterious health side effects and are, therefore, a subject of regulatory scrutiny.

One common approach to NOx reduction involves the injection of a reducing agent over a catalyst to convert $NO_x$ to $N_2$. Even more specifically, the use of ammonia with a selective catalytic reduction ("SCR") catalyst is presently the most common approach to $NO_x$ reduction. In some applications, this approach may be effective for removing 80 to 95% of $NO_x$ from a gas stream; however, the use of an ammonia reactant may be a significant operating cost.

As such, it would be desirable to provide new systems and methods for $NO_x$ reduction. It would also be desirable to provide new systems and methods for $NO_x$ reduction that eliminate the need for or reduce the utilization of reducing reactants such as ammonia.

BRIEF SUMMARY OF THE INVENTION

In one aspect, a system is provided for reducing $NO_x$ emission. The system may comprise a gas production source configured to produce a gas stream comprising $NO_x$, and an oxidation catalyst positioned downstream of the gas production source. The oxidation catalyst may be configured to oxidize NO gas molecules in the gas stream to yield higher order $N_xO_y$ molecules. A removal system may be positioned downstream of the oxidation catalyst may be configured to remove higher order $N_xO_y$ molecules from the gas stream by solvent absorption or reaction. The system may further comprise a secondary $NO_x$ trimming system positioned downstream of the oxidation catalyst, wherein the secondary $NO_x$ trimming system is configured to inject a reactant into the gas stream, the reactant configured to react with $NO_x$ molecules present in the gas stream.

In another aspect, a control system is provided for reducing $NO_x$ emissions from a system. The control system may comprise a measuring system comprising a sensor adapted and positioned to measure a characteristic of the gas stream or the fuel, wherein the measuring system is configured to transmit data indicative of the measured characteristic. The system may also comprise a controller that is configured to receive data transmitted from the measuring system, wherein the controller is configured to execute an algorithm to determine an amount of the reactant to be added to the gas stream dependent on the data transmitted from the measuring system. The controller may be configured to generate control signals indicative of the amount of the reactant to be added. The system may further comprise an actuator that is adapted to regulate the amount of the reactant injected into the gas stream in response to the control signals generated by the controller.

In another aspect, a method is provided for reducing $NO_x$ emissions from a gas stream produced by a production source. The method may comprise oxidizing a portion of NO gas present in the gas stream by contacting the gas stream with an oxidation catalyst to yield higher order $N_xO_y$ molecules; removing higher order $N_xO_y$ molecules from the gas stream by solvent absorption or reaction; and injecting a reactant into the gas stream downstream of the oxidation catalyst, the reactant configured to react with $NO_x$ molecules present in the gas stream.

DETAILED DESCRIPTION OF THE INVENTION

Figure 1:
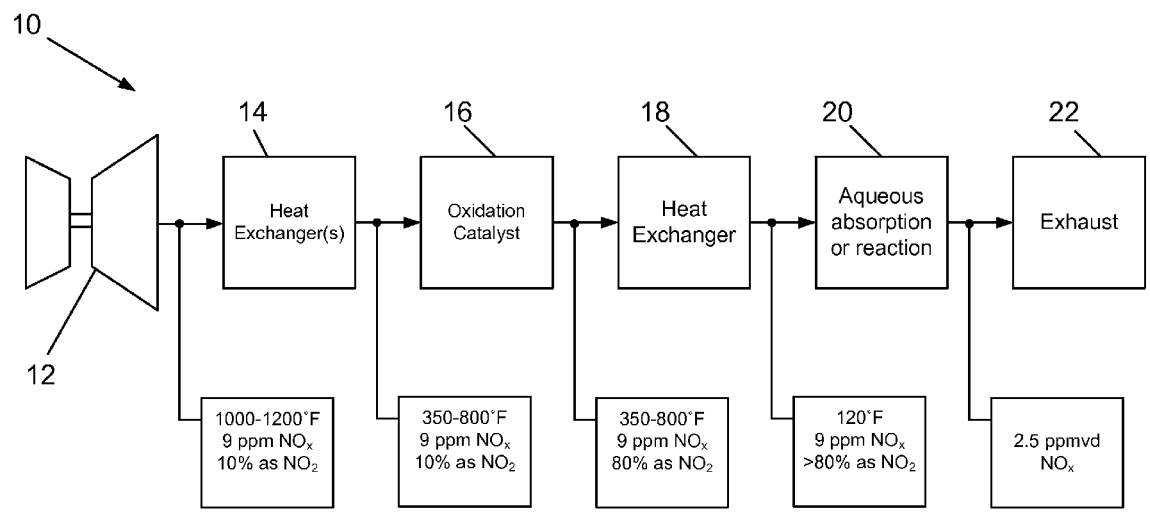
FIG. 1 is a diagram, illustrating a system for reducing $NO_x$ emissions in accordance with one or more embodiments of the present invention.

Systems and methods are provided for reducing $NO_x$ emissions from $NO_x$ producing sources. The systems and methods may be used in various $NO_x$ producing applications, including, but not limited to, gas combustion, steam production, and hydrocarbon refining applications. The systems and methods may generally be employed in any application in which a gas stream comprising $NO_x$ is produced. In an exemplary embodiment, systems and methods of the present invention may be employed to reduce $NO_x$ emissions from a gas turbine engine. In another embodiment, systems and methods of the present invention may be employed to reduce $NO_x$ emissions from a boiler. In yet another embodiment, systems and methods of the present invention may be employed to reduce $NO_x$ emissions from a refinery.

Systems and methods of the present invention may achieve abatement of $NO_x$ from a gas stream primarily by the oxidation of NO molecules in the gas stream to higher order $N_xO_y$ molecules, and the subsequent removal of the higher order $N_xO_y$ molecules by solvent absorption or reaction. Such an approach may advantageously avoid or reduce the need for the continuous injection of reducing agents. In some embodiments, the system may remove 80 to 95% of $NO_x$ from the post-combustion gas stream without the addition of reactants to the gas stream. Similarly, such an system may reduce or eliminate the need for addition of oxidizing agents or energy sources such as ozone ($O_3$) to create $N_xO_y$ species with higher solvent absorption or reaction like $N_2O_5$.

The term "higher order $N_xO_y$ molecules", as used herein, refers to $N_xO_y$ molecules in which the value of x and/or y is greater than 1. These molecules may be the product of the oxidation of NO. For example, the term higher order $N_xO_y$ molecules encompasses $NO_2$ and $N_2O_5$. The term also encompasses other nitrogen oxides that are of a higher order than NO, including $N_2O$, $N_2O_3$, and $N_2O_4$.

Methods

In one aspect, methods are provided for reducing $NO_x$ emissions from a gas stream produced by a production source. The method may comprise oxidizing a substantial portion of NO gas present in the gas stream by contacting the gas stream with an oxidation catalyst to yield higher order $N_xO_y$ molecules (such as $NO_2$ and/or $N_2O_5$), and thereafter removing $NO_2$ gas from the gas stream by aqueous absorption or reaction.

As used herein, the term "oxidation catalyst" generally refers to a device that oxidizes NO molecules to yield higher order $N_xO_y$ molecules, e.g., $NO_2$ and/or $N_2O_5$. The oxidation catalyst may be a flow through device having an internal honeycomb structure coated with the chemical catalyst. In one embodiment, the oxidation catalyst may be a CO catalyst. In some embodiments, the oxidation catalyst is configured to oxidize a sufficient quantity of NO molecules in the gas stream such that the majority of $N_xO_y$ molecules in the gas stream exiting the oxidation catalyst are $NO_2$ molecules. In some embodiments, the majority of $NO_x$ molecules in the gas stream are NO molecules before the gas stream is contacted with the oxidation catalyst. Preferably, the oxidation catalyst may be placed at a location along the gas stream flow path where it will be exposed to gas stream temperatures in the range of about 350° F. to about 700° F. It has been found that operating the oxidation catalyst at such a temperature range may advantageously allow the catalyst to thermodynamically favor the production $N_xO_y$ due to the lower operating temperature while providing an adequate temperature to achieve the desired rate kinetics over the catalyst surface. It has also been found that the presence of $SO_x$ to the exhaust stream may shift the optimal temperature to the higher value.

In an exemplary embodiment, a conventional gas turbine engine may produce a gas stream in which about 90% of the $NO_x$ molecules are NO. The oxidation catalyst may be configured to produce a gas stream in which about 50% or more of the $NO_x$ molecules are higher order $N_xO_y$ molecules (e.g., $NO_2$, and or $N_2O_5$), or more preferably about 70% or more of the $NO_x$ molecules are higher order $N_xO_y$ molecules, or even more preferably about 80% or more of the $NO_x$ molecules are higher order $N_xO_y$ molecules. For a CO catalyst not treated with $NO_x$ oxidation inhibitors, greater than 80% higher order $N_xO_y$ in $NO_x$ may be achieved at temperatures of about 700° F. or below. An oxidation efficiency of about 85% may be achieved in the range of about 350° F. to about 700° F. using a platinum-based oxidation catalyst. The range may vary depending on catalyst composition, catalyst surface treatment, and catalyst surface area.

In some embodiments, the method may further comprise combusting a fuel to produce the gas stream, wherein the gas stream comprises the reaction products of the combustion of the fuel. For example, the fuel may comprise a hydrocarbon fuels, a non-hydrocarbon fuel or combinations thereof. In exemplary embodiments, the fuel may comprise natural gas, oil or coal. The gas stream may be produced by various production sources including, but not limited to, a gas turbine, a boiler, a furnace, refinery, or a chemical processing plant.

Higher order $N_xO_y$ molecules in the gas stream may be removed downstream of the oxidation catalyst by solvent absorption (such as by aqueous absorption) or reaction. The higher order $N_xO_y$ molecules, particularly $NO_2$ and $N_2O_5$ molecules, are soluble in water, and may be removed from the gas stream by applying water to the gas stream. For example, water may be sprayed into the gas stream to absorb higher order $N_xO_y$ molecules in the gas stream. The water and higher order $N_xO_y$ molecules may be thereafter separated from the gas stream. In certain embodiments, a water collector adapted to condense water vapor in the gas stream may be placed downstream of the oxidation catalyst. In another embodiment, an aqueous or other solvent film is support on a high surface area structure, such as a demister pad, and $N_xO_y$ transport to the film. The condensed water may absorb higher order $N_xO_y$ molecules in the gas stream and the water and higher order $N_xO_y$ molecules may be thereafter separated from the gas stream. In other embodiments, the higher order $N_xO_y$ molecules may be separated by reaction of the higher order $N_xO_y$ molecules with a reactant. For example, $NO_2$ molecules may contact and react with soda lime, such as in a lime based water solution.

In certain embodiments, the oxidation of NO molecules to higher order $N_xO_y$ molecules and aqueous absorption and/or reaction of the higher order $N_xO_y$ molecules is performed in a manner effective to remove at least 40% of the $NO_x$ molecules from the gas stream. In a preferred embodiment, the oxidation of NO molecules to higher order $N_xO_y$ molecules and aqueous absorption and/or reaction of the higher order $N_xO_y$ molecules is performed in a manner effective to remove at least 75% of the $NO_x$ molecules from the gas stream. Such a level of $NO_x$ reduction may advantageously be achieved without the addition of ammonia.

In some embodiments, the nature of a fuel source or required reduction level may require an even greater amount of $NO_x$ to be removed from the gas stream. $NO_x$ trimming methods are provided for enhanced $NO_x$ reduction from a gas stream produced by a production source, particularly $NO_x$ production sources that produce higher levels of $NO_x$ or where greater $NO_x$ abatement is needed or desired.

The method may comprise oxidizing a substantial portion of NO gas present in the gas stream by contacting the gas stream with an oxidation catalyst to yield $NO_2$ gas and/or other higher order $N_xO_y$ oxides; removing higher order $N_xO_y$ molecules from the gas stream by solvent absorption or reaction; and injecting a reactant into the gas stream downstream of the oxidation catalyst, the reactant configured to react with $NO_x$ molecules present in the gas stream. For example, a reactant may be added that reacts with NO molecules in the gas stream. In some embodiments, the reactant may be ozone or ammonia. In some embodiments, the method may further comprise controlling the amount of reactant added to the gas stream based on emission measurement or model-based control.

In some embodiments, the reactant may be added after higher order $N_xO_y$ molecules is removed from the gas stream. The oxidation of NO to $NO_2$ or other $N_xO_y$ oxides over a catalyst reduces the total ozone required to form nitrogen oxides such as $N_2O_5$ that may be easily scrubbed from the exhaust stream. For example, about one mole of ozone is required to oxidize one mole of NO to one mole of $NO_2$, whereas about half a mole of ozone is required to oxidize one mole of $NO_2$ to even more soluble $N_2O_5$ for higher $NO_x$ removal from the exhaust stream. Thus oxidizing NO to $NO_2$ over an oxidation catalyst may reduce the ozone demand by about 66% for systems that add ozone to the exhaust prior to scrubbing, e.g., a LoTOx process. This advantageously may result in lower capital and operating costs for such systems.

Systems

In another aspect, systems are provided for reducing $NO_x$ emissions. The system may comprise a gas production source configured to produce a gas stream comprising $NO_x$; an oxidation catalyst positioned downstream of the gas production source, the oxidation catalyst configured to oxidize NO gas molecules in the gas stream to yield higher order $N_xO_y$ molecules; and a removal device positioned downstream of the oxidation catalyst configured to remove $N_xO_y$ molecules from the gas stream by aqueous absorption or reaction.

In some embodiments, the system may include a gas production source that is configured to combust a fuel to produce the gas stream comprising the reaction products of the combustion of the fuel. The fuel may comprise a hydrocarbon fuel such as natural gas, oil or coal. The gas stream may be produced by various production sources including, but not limited to, a gas turbine, a boiler, a furnace or a chemical processing plant (such as a refinery).

Higher order $N_xO_y$ molecules in the gas stream may be removed downstream of the oxidation catalyst by aqueous absorption or reaction. The higher order $N_xO_y$ molecules are soluble in water, and may be removed from the gas stream by applying water to the gas stream. For example, water may be sprayed into the gas stream by a water injecting device, e.g., through one or more spray nozzles, to absorb higher order $N_xO_y$ molecules in the gas stream. The water and higher order $N_xO_y$ molecules may be thereafter separated from the gas stream. In certain embodiments, a water collector adapted to condense water vapor in the gas stream may be placed downstream of the oxidation catalyst. The condensed water may absorb higher order $N_xO_y$ molecules in the gas stream and the water and higher order $N_xO_y$ molecules may be thereafter separated from the gas stream. In other embodiments, the higher order $N_xO_y$ molecules may be separated by reaction of the higher order $N_xO_y$ molecules with a reactant. For example, the higher order $N_xO_y$ molecules may contact and react with soda lime solution.

In certain embodiments, the oxidation of NO molecules to higher order $N_xO_y$ molecules and aqueous absorption and/or reaction of the higher order $N_xO_y$ molecules is performed in a manner effective to remove at least 40% of the $NO_x$ molecules from the gas stream. In a preferred embodiment, the oxidation of NO molecules to higher order $N_xO_y$ molecules and aqueous absorption and/or reaction of the higher order $N_xO_y$ molecules is performed in a manner effective to remove at least 75% of the $NO_x$ molecules from the gas stream. Such a level of $NO_x$ reduction may advantageously be achieved without the addition of ammonia.

An embodiment of a system for reducing NOx emissions is illustrated in FIG. 1. The system 10 may have a $NO_x$ production source, such as a gas turbine engine 12. The gas turbine engine 12 may produce a gas stream having an exhaust temperature of about 800 to about 1200° F. and a $NO_x$ concentration of 9 ppm. Approximately 10% of the $NO_x$ emissions may comprise $NO_2$ and the balance primarily NO. The gas stream may pass through one or more heat exchangers 14 so that the gas stream may be cooled to about 350 to about 800° F. The gas stream may then pass through an oxidation catalyst 16 where a substantial portion of the NO molecules are oxidized to higher order $N_xO_y$ molecules. In the embodiment of FIG. 1, the gas stream exiting the oxidation catalyst 16 may have a $NO_x$ concentration of 9 ppm with approximately 80% of the $NO_x$ emissions comprising $NO_2$ or other higher order nitrogen oxides such as $N_2O_5$. The gas stream may then be further cooled to about 120° F. in a heat exchanger 18.

The cooled gas stream may then pass through a vessel 20 where the $N_xO_y$ is scrubbed in a solvent, such as an aqueous solvent, and absorbed or reacted and then removed from the gas stream. For example, the vessel 20 may comprise a water injecting device that injects water or other solvent for $N_xO_y$ into the gas stream. In some embodiments, the vessel 20 may comprise a water collecting device that condenses water vapor in the gas stream. The liquid water and absorbed higher order $N_xO_y$ molecules may then be separated from the gas stream and the gas stream may then pass through the exhaust 22 to the atmosphere. The exhaust gas stream may comprise 2.5 ppmvd $NO_x$. In another embodiment, the vessel 20 may comprise soda lime or another reactant for $NO_2$.

Aqueous absorption and/or reaction of higher order $N_xO_y$ molecules may be achieved in various ways. For example, for fuels with high sulfur content, aqueous absorption and/or reaction of higher order $N_xO_y$ molecules may be performed as part of a flue gas desulfurization ("FGD") process within an FGD unit. Various types of scrubbers may be employed to separate the higher order $N_xO_y$ molecules from the gas stream including spray towers, packed bed scrubbers, and/or venturi scrubbers.

In some embodiments, the nature of a fuel source or required reduction level may require an even greater amount of $NO_x$ to be removed from the gas stream. $NO_x$ trimming systems are provided for enhanced $NO_x$ reduction from a gas stream produced by a production source, particularly $NO_x$ production sources that produce higher levels of $NO_x$ or where greater $NO_x$ abatement is needed or desired.

In one embodiment, a system is provided for reducing $NO_x$ emissions comprising a gas production source configured to produce a gas stream comprising $NO_x$ and an oxidation catalyst positioned downstream of the gas production source. The oxidation catalyst may be configured to oxidize NO gas molecules in the gas stream to yield higher order $N_xO_y$ molecules. The system may further comprise a removal system positioned downstream of the oxidation catalyst configured to remove higher order $N_xO_y$ molecules from the gas stream by aqueous absorption or reaction. A secondary $NO_x$ trimming system may be positioned downstream of the oxidation catalyst. The secondary $NO_x$ trimming system may be configured to inject a reactant into the gas stream to react with $NO_x$ molecules present in the gas stream.

The system may also include a $NO_x$ trimming control system. The $NO_x$ trimming control system may be configured to control the amount of reactant added to the gas stream. The $NO_x$ trimming control system may be configured to control the amount of reactant added to the gas stream based on emission measurement or model-based control.

Various $NO_x$ trimming systems may be used. In some embodiments, the NOx trimming system comprises an ozone injection system for injecting ozone into the gas stream. In other embodiments, the trimming system an ammonia injection system and a selective catalytic reduction catalyst (SCR) downstream of the ammonia injection system. Although such trimming systems may require the continuous injection of reducing agents in some embodiments, the demand for reducing agents may be substantially reduced because the removal system for removing higher order $N_xO_y$ molecules may be utilized as the primary $NO_x$ abatement system. For example, the removal system is configured to remove at least 40% of the $NO_x$ molecules present in the gas stream, or more preferably at least 75% of the $NO_x$ molecules present in the gas stream.

In some embodiments, the majority of $NO_x$ molecules present in the gas stream are NO molecules before the gas stream contacts the oxidation catalyst. For example, in a gas turbine engine system, approximately 90% of the $NO_x$ molecules in the turbine exhaust may be NO. In some embodiments, the oxidation catalyst may oxidize about 50% or more of the NO molecules produced by the production source. In certain embodiments, the oxidation catalyst may oxidize about 75% or more of the NO molecules produced by the production source.

Figure 2:
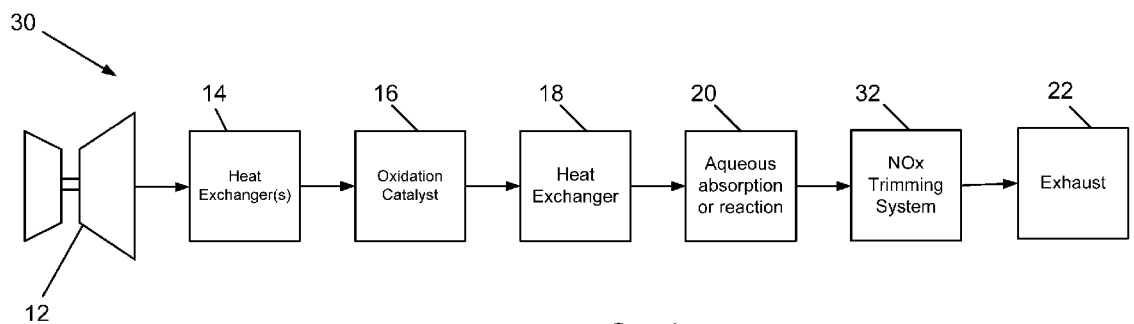
FIG. 2 is a diagram, illustrating a system with additional $NO_x$ trimming for reducing $NO_x$ emissions in accordance with one or more embodiments of the present invention.

A NOx reduction system with secondary $NO_x$ trimming is illustrated in FIG. 2. The $NO_x$ reduction system 30 may have a $NO_x$ production source, such as a gas turbine engine 12. The gas turbine engine 12 may produce a gas stream having comprising products of the combustion of a fuel, including $NO_x$. The gas stream may pass through one or more heat exchangers 14 and then pass through an oxidation catalyst 16 where a substantial portion of the NO molecules are oxidized to higher order $N_xO_y$ molecules. The gas stream may then be further cooled in a heat exchanger 18.

The cooled gas stream may then pass through a vessel 20 where the higher order $N_xO_y$ molecules are aqueously absorbed or reacted and removed from the gas stream. For example, the vessel 20 may comprise a water injecting device that injects water or other solvent for $NO_2$ into the gas stream. In some embodiments, the vessel 20 may comprise a water collecting device that condenses water vapor in the gas stream. The liquid water and absorbed $NO_2$ may then be separated from the gas stream and the gas stream may then pass through the NOx trimming system 32.

In another embodiment, the vessel 20 may comprise a heat exchanger and a scrubber to provide a combined cooling and scrubbing stage. For applications in which there is a high concentration of $SO_x$ in the exhaust stream, the exhaust temperature may be above 350° F. entering the vessel 20. In the vessel 20, the exhaust temperature may be reduced to about 250° F. or below before ozone addition to inhibit rapid destruction of ozone before effective oxidation of NO and $NO_2$ to $N_2O_5$. The vessel 20 may scrub some of the $NO_x$ and $SO_x$ before the $NO_x$ trimming system 32 which, in some embodiments, may provide the function of ozone addition and a final aqueous scrubbing stage.

In $NO_x$ trimming system 32, a reactant may be injected in to the gas stream to react with NO molecules present in the gas stream. For example, ammonia or ozone may be injected into the gas stream in $NO_x$ trimming system 32. In some embodiments, the $NO_x$ trimming system 32 may comprise an ozone injection system and an aqueous scrubbing system. The ozone may react with $NO_x$ molecules to produce $N_2O_5$ and/or $NO_2$ or other $N_xO_y$, which may be subsequently be removed by the aqueous scrubbing system in the exhaust 22.

Figure 3:
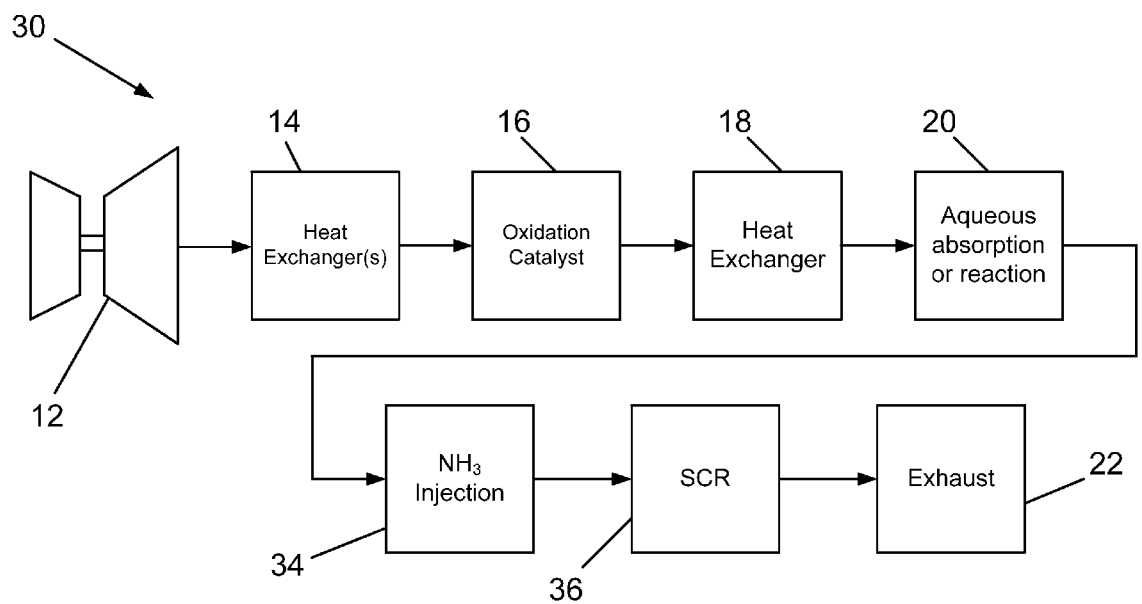
FIG. 3 is a diagram, illustrating a system with additional $NO_x$ trimming provided by ammonia injection for reducing $NO_x$ emissions in accordance with one or more embodiments of the present invention.

In some embodiments, the $NO_x$ trimming system may comprise a $NO_x$ reducing agent injection system and reduction catalyst for converting $NO_x$ molecules into $N_2$ and $O_2$. For example, as illustrated in FIG. 3, the gas stream exiting the vessel 20 may be fed through an ammonia injection system 34 and then to a low temperature selective catalytic reduction (SCR) catalyst 36. The gas stream may then pass through the exhaust 22 to the atmosphere.

Control Systems

In another aspect, control systems are provided for reducing $NO_x$ emissions. The control system may be used to control the injection of a trimming reactant as part of a $NO_x$ reduction system. For example, the control system may be used with a $NO_x$ reduction system comprising a gas production source that is configured to produce a gas stream comprising $NO_x$ from combustion of a fuel and an oxidation catalyst positioned downstream of the gas production source. The oxidation catalyst may be configured to oxidize NO gas molecules in the gas stream to yield higher order $N_xO_y$ molecules such as $NO_2$ and $N_2O_5$ gas molecules. The $NO_x$ reduction system may further comprise an $NO_2$ removal system positioned downstream of the oxidation catalyst that is configured to remove $NO_2$ molecules from the gas stream by aqueous absorption or reaction, and a secondary $NO_x$ trimming system positioned downstream of the oxidation catalyst that is configured to inject a reactant into the gas stream. The reactant may be configured to react with $NO_x$ molecules present in the gas stream.

The control system may comprise a measuring system comprising a sensor adapted and positioned to measure one or more characteristics of the gas stream or the fuels. For example, the measuring system may be configured to measure at least one of a concentration of $NO_x$, a concentration of NO, or a concentration of $NO_2$. In some embodiments, the sensor is positioned upstream of the $NO_x$ trimming system. In certain embodiments, the sensor is positioned downstream of the oxidation catalyst. In certain embodiments, the sensor is positioned downstream of the removal system for higher order $N_xO_y$ molecules. The measuring system may be configured to transmit data indicative of the measured characteristic.

The control system may also comprise a controller that is configured to receive data transmitted from the measuring system. The controller may execute an algorithm to determine an amount of the reactant to be added to the gas stream dependent on the data transmitted from the measuring system. As such, the controller may determine the amount of reactant to be added based on the measured characteristic of the gas stream or fuel. For example, if the sensor measures a gas stream characteristic upstream of the $NO_x$ trimming system, the controller may employ a model-based algorithm to determine the amount of reactant to add to the gas stream to achieve the desired $NO_x$ reduction. If the sensor measures a gas stream characteristic downstream of the $NO_x$ trimming system, the controller may employ a closed-loop feedback control algorithm to adjust the amount of reactant added until the desired gas stream characteristic, e.g., a pre-designated control set point, is achieved.

In some embodiments, the controller may receive data from multiple sensors and determine the amount of reactant to be added based upon a multi-variable algorithm. For example, the controller may receive data from one or more sensors indicating multiple gas stream characteristics, including, but not limited to, the concentration of $NO_x$, the concentration of NO, the concentration of $NO_2$, or gas stream temperature. The sensors may also be placed at one or more locations along the gas stream flow path. Based on the data transmitted by the one or more sensors, the controller may be being configured to generate control signals indicative of the amount of the reactant to be added.

The control system may also comprise an actuator adapted to regulate the amount of the reactant that is injected into the gas stream in response to the control signals generated by the controller. For example, the actuator may comprise a control valve or other device suitable for controlling the amount of reactant that is added to the gas stream.

Figure 4:
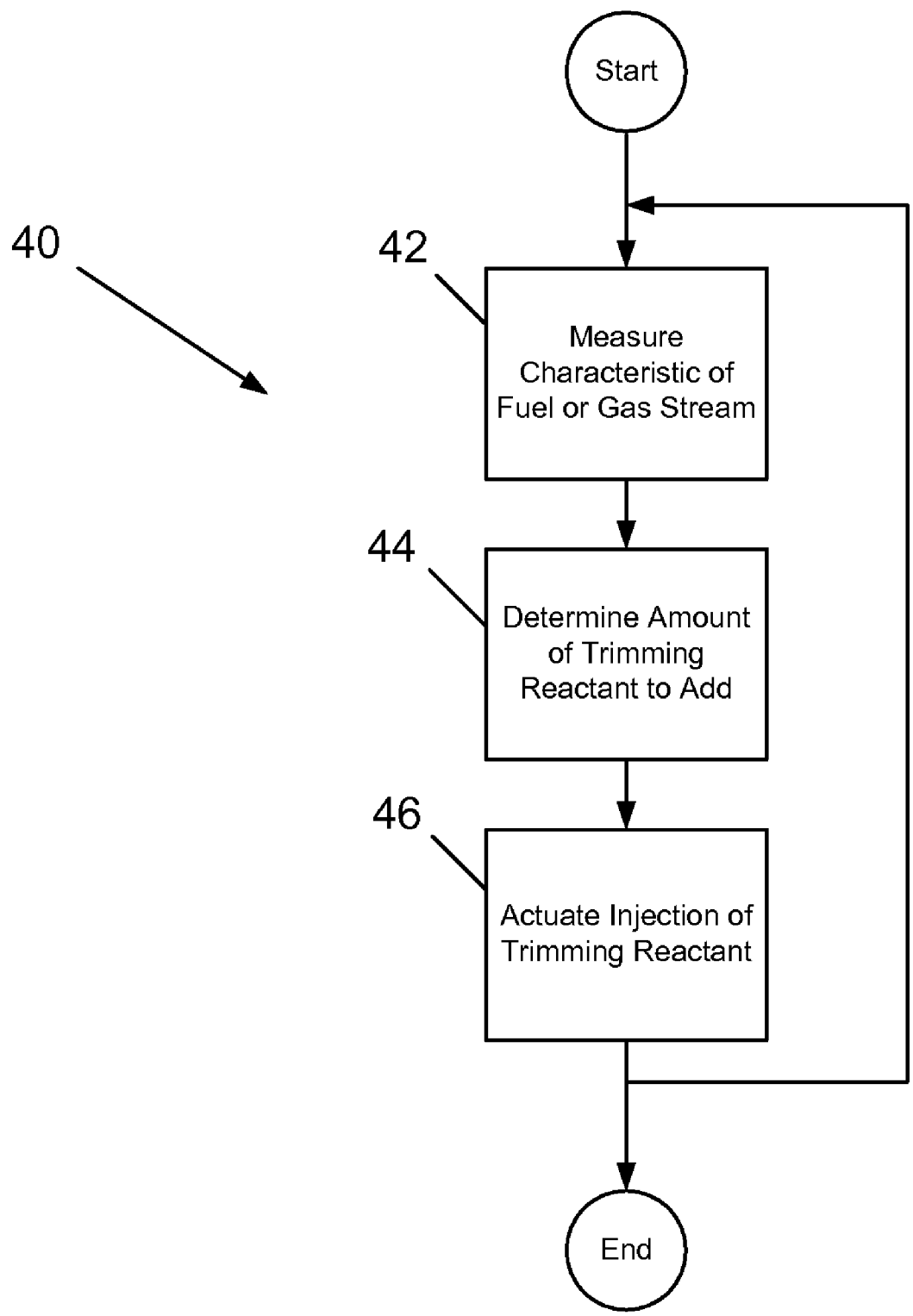
FIG. 4 is a schematic, illustrating a control scheme for reducing $NO_x$ emissions in accordance with one or more embodiments of the present invention.

An exemplary control scheme for a control system is illustrated in FIG. 4. A control method 40 may comprise a sensing or measuring step 42 in which a fuel or gas stream is measured. For example, the concentration of $NO_x$, NO, and/or $NO_2$ at one or more location in the gas stream may be measured. In some embodiments, the fuel may be analyzed to determine the nitrogen content of the fuel or the staged location, atomization quality and/or amount of scrubbing flow in a Flue Gas Desulfurization (FGD) unit by way of example.

The controller may then perform a determination step 44 in which an amount of trimming reactant or scrubbing agent to add to the gas stream is determined. In some embodiments, the determination step 44 may be performed by comparing one or more gas stream measurements to one or more pre-designated control set points. In some embodiments, the determination step 44 may involve the execution of a model-based control algorithm. For example, the controller may compute or otherwise determine an amount of reactant or solvent or both to add to the gas stream to achieve the desired level of NO reduction.

Once the controller performs determination step 44, the controller may perform actuation step 46 to actuate the injection of the trimming reactant into the gas stream. The actuation step 46 may involve the transmission of control signals to an actuator, such as a control valve, to regulate the amount of reactant that is added to the gas streams. Various reactants may be added to the gas stream, including, but not limited to, ozone or ammonia.

In some embodiments, the control scheme of FIG. 4 may be conducted continuously or near continuously while the $NO_x$ production source is in operation. In some embodiments, the control scheme may be triggered by an event, e.g., the detection or measurement of a condition that meets or exceeds one or more pre-designated control set points. Similarly, the process may be ended after detection or measurement of a condition that satisfies one or more pre-designated control set points.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for reducing $NO_x$ emissions comprising:
   a gas production source configured to produce a gas stream comprising $NO_x$;
   an oxidation catalyst positioned downstream of the gas production source, the oxidation catalyst configured to oxidize NO gas molecules in the gas stream to yield higher order $N_xO_y$ molecules;
   a removal system positioned downstream of the oxidation catalyst configured to remove higher order $N_xO_y$ molecules from the gas stream by solvent absorption or reaction; and
   a secondary $NO_x$ trimming system positioned downstream of the oxidation catalyst, the secondary $NO_x$ trimming system configured to inject a reactant into the gas stream, the reactant configured to react with $NO_x$ molecules present in the gas stream.

2. The system of claim 1, further comprising a $NO_x$ trimming control system, wherein the $NO_x$ trimming control system is configured to control the amount of reactant added to the gas stream.

3. The system of claim 2, wherein the $NO_x$ trimming control system is configured to control the amount of reactant added to the gas stream based on at least one of emission measurement or model-based control.

4. The system of claim 1, wherein the reactant is ozone or ammonia.

5. The system of claim 1, wherein the secondary trimming system comprises an ozone injection system.

6. The system of claim 5, wherein the secondary trimming system comprises an aqueous scrubber downstream of the ozone injection system.

7. The system of claim 1, wherein the secondary trimming system comprises an ammonia injection system.

8. The system of claim 7, wherein the secondary trimming system comprises a selective catalytic reduction catalyst downstream of the ammonia injection system.

9. The system of claim 1, wherein the removal system is configured to remove at least 40% of the $NO_x$ molecules present in the gas stream.

10. The system of claim 1, wherein the majority of $NO_x$ molecules present in the gas stream are NO molecules before the gas stream contacts the oxidation catalyst.

11. A control system for reducing $NO_x$ emissions from a system comprising a gas production source configured to produce a gas stream comprising $NO_x$ from a fuel; an oxidation catalyst positioned downstream of the gas production source, the oxidation catalyst configured to oxidize NO gas molecules in the gas stream to yield higher order $N_xO_y$ molecules; a removal system positioned downstream of the oxidation catalyst configured to remove higher order $N_xO_y$ molecules from the gas stream by solvent absorption or reaction; and a secondary $NO_x$ trimming system positioned downstream of the oxidation catalyst, the secondary $NO_x$ trimming system configured to inject a reactant into the gas stream, the reactant configured to react with $NO_x$ molecules present in the gas stream; the control system comprising:
   a measuring system comprising a sensor adapted and positioned to measure a characteristic of the gas stream or the fuel, the measuring system configured to transmit data indicative of the measured characteristic;
   a controller configured to receive data transmitted from the measuring system, the controller executing an algorithm to determine an amount of the reactant to be added to the gas stream dependent on the data transmitted from the measuring system, the controller being configured to generate control signals indicative of the amount of the reactant to be added; and
   an actuator adapted to regulate the amount of the reactant injected into the gas stream in response to the control signals generated by the controller.

12. The control system of claim 11, wherein the measuring system is configured to measure at least one of a concentration of $NO_x$, a concentration of NO, or a concentration of $NO_2$.

13. The control system of claim 11, wherein the sensor is positioned upstream of the $NO_x$ trimming system.

14. The control system of claim 13, wherein the sensor is positioned downstream of the removal system.

15. The control system of claim 11, wherein the sensor is positioned downstream of the oxidation catalyst.

16. The control system of claim 11, wherein the sensor is positioned downstream of the removal system.

17. The control system of claim 11, wherein the reactant is ozone or ammonia.

18. A method of reducing $NO_x$ emissions from a gas stream produced by a production source comprising:
   (a) oxidizing a portion of NO gas present in the gas stream by contacting the gas stream with an oxidation catalyst to yield higher order $N_xO_y$ molecules;
   (b) removing higher order $N_xO_y$ molecules from the gas stream by solvent absorption or reaction; and
   (c) injecting a reactant into the gas stream downstream of the oxidation catalyst, the reactant configured to react with $NO_x$ molecules present in the gas stream.

19. The method of claim 18, further comprising controlling the amount of reactant added to the gas stream based on at least one of emission measurement or model-based control.

20. The method of claim 18, wherein the reactant is ozone or ammonia.

* * * * *